(12) United States Patent
Senn et al.

(10) Patent No.: US 11,377,306 B2
(45) Date of Patent: Jul. 5, 2022

(54) DEVICE FOR GROUPING CONTAINERS

(71) Applicant: KRONES AG, Neutraubling (DE)

(72) Inventors: Konrad Senn, Alteglofsheim (DE); Andreas Roithmeier, Neutraubling (DE); Helmut Schuesslburner, Straubing (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/291,596

(22) PCT Filed: Sep. 24, 2019

(86) PCT No.: PCT/EP2019/075700
§ 371 (c)(1),
(2) Date: May 5, 2021

(87) PCT Pub. No.: WO2020/094289
PCT Pub. Date: May 14, 2020

(65) Prior Publication Data
US 2021/0403250 A1    Dec. 30, 2021

(30) Foreign Application Priority Data
Nov. 8, 2018   (DE) ..................... 10 2018 219 082.8

(51) Int. Cl.
*B65G 47/71*   (2006.01)
*B65G 47/08*   (2006.01)
*B65G 47/82*   (2006.01)

(52) U.S. Cl.
CPC ......... *B65G 47/715* (2013.01); *B65G 47/082* (2013.01); *B65G 47/088* (2013.01);
(Continued)

(58) Field of Classification Search
CPC .. B65G 47/715; B65G 47/082; B65G 47/088; B65G 47/82; B65G 2201/0244;
(Continued)

(56) References Cited

U.S. PATENT DOCUMENTS 2,080,858 A   5/1937   Dorman
2,203,385 A   6/1940   Figel
(Continued)

FOREIGN PATENT DOCUMENTS

DE   6606997 U    1/1971
DE   19719957 C1  1/1999
(Continued)

OTHER PUBLICATIONS

"AQFlex® XS: advanced performance and unique agility in a compact design," YouTube Website, Available Online at https://www.youtube.com/watch?v=prxI8DnJjTw, May 5, 2017, 3 pages.
(Continued)

*Primary Examiner* — Mark A Deuble
(74) *Attorney, Agent, or Firm* — McCoy Russell LLP (57) ABSTRACT

The present invention relates to an apparatus for grouping containers, comprising: a first conveyor belt for transporting the containers in a first transport direction; a second conveyor belt; a container receiving device; a transfer device, which is designed to transfer at least some of the containers from the first conveyor belt to the second conveyor belt transversely to the first transport direction and to transfer at least some of the containers transferred to the second conveyor belt to the container receiving device transversely to the first transport direction; and a motor device, in particular a long stator motor device, which is designed to move the transfer device for transferring a container.

20 Claims, 7 Drawing Sheets

(52) U.S. Cl.
CPC ...... *B65G 47/82* (2013.01); *B65G 2201/0244* (2013.01); *B65G 2811/0615* (2013.01)

(58) Field of Classification Search
CPC ............ B65G 2811/0615; B65G 54/02; B65G 47/10; B65G 47/084; B65G 47/086
See application file for complete search history.

(56) References Cited

U.S. PATENT DOCUMENTS

| | | | |
|---|---|---|---|
| 3,708,052 A | | 1/1973 | Faure |
| 3,771,648 A | | 11/1973 | Revuelta |
| 3,987,889 A | | 10/1976 | Godoy |
| 4,290,517 A | * | 9/1981 | Hafferkamp ............ B65G 47/82 198/430 |
| 5,472,077 A | * | 12/1995 | Bolin ...................... B65G 47/82 198/740 |
| 5,893,449 A | * | 4/1999 | Leidy ...................... C03B 35/06 198/740 |
| 5,950,799 A | * | 9/1999 | Peltier ....................... C03B 9/41 198/430 |
| 9,233,868 B2 | | 1/2016 | Simon |
| 9,540,183 B2 | * | 1/2017 | Papsdorf ................ B65G 54/02 |
| 11,155,422 B2 | * | 10/2021 | Berger ................ B65G 47/5109 |
| 2017/0107003 A1 | | 4/2017 | Duchemin et al. |

FOREIGN PATENT DOCUMENTS

| | | |
|---|---|---|
| DE | 102012201059 A1 | 7/2013 |
| DE | 102015203042 A1 | 8/2016 |
| DE | 102015209613 A1 | 12/2016 |
| DE | 202016101207 U1 | 7/2017 |
| FR | 2607481 A1 | 6/1988 |
| FR | 2820730 A1 | 8/2002 |
| WO | WO-9609974 A1 * 4/1996 ............ B65G 47/82 |
| WO | 9613466 A1 | 5/1996 |
| WO | 2019129968 A1 | 7/2019 |

OTHER PUBLICATIONS

German Patent and Trademark Office, Search Report Issued in Application No. 102018219082.8, dated Jul. 17, 2019, 15 pages. (Submitted with Machine Translation).

ISA European Patent Office, International Search Report Issued in Application No. PCT/EP2019/075700, dated May 18, 2020, WIPO, 4 pages.

ISA European Patent Office, Written Opinion of the International Searching Authority Issued in Application No. PCT/EP2019/075700, dated May 18, 2020, WIPO, 13 pages.

* cited by examiner

DEVICE FOR GROUPING CONTAINERS

CROSS REFERENCE TO RELATED APPLICATIONS

The present application is a U.S. National Phase of International Application No. PCT/EP2019/075700 entitled "DEVICE FOR GROUPING CONTAINERS," and filed on Sep. 24, 2019. International Application No. PCT/EP2019/075700 claims priority to German Patent Application No. 10 2018 219 082.8 filed on Nov. 8, 2018. The entire contents of each of the above-listed applications are hereby incorporated by reference for all purposes.

TECHNICAL FIELD

The present invention relates to a device for grouping transported containers, for example bottles, in particular in a container treatment plant.

BACKGROUND AND SUMMARY

In container treatment plants, containers, such as for example bottles, cans etc., are treated in a plurality of successive process steps. Here, the process steps are in general performed in separate treatment units which can be combined, for example, as modules of one common plant concept. A container treatment plant for glass bottles or plastic bottles, e.g. of polyethylene terephthalate (PET), polypropylene (PEP) etc., may comprise, for example, a blow moulding means, a filling device, a labelling device, a packaging device, a sterilization device, an inspection device etc. as separate, modularly designed treatment units. The individual treatment units, which perform successive process steps, are in general connected in series one behind the other, one or several transport devices providing the transport of the containers from the treatment units to the respective downstream treatment units.

The performance of successive process steps by the separate treatment units of the plant and the transport between the treatment units thus corresponds to the known principle of conveyor line processing, wherein a continuous stream of containers to be treated is achieved by the treatment units arranged in series by means of suited control processes with respect to the process duration of the individual process steps and/or the amount of the containers transported from one treatment unit to the next treatment unit per unit of time. In the plants known in prior art, the transport of the containers between the treatment units is realised by means of conveyor belts, and optionally by means of a plurality of separate transport elements in the form of carriers which pick up the containers or preforms by means of suited retaining devices, e.g. especially shaped gripping units, at a pick-up point, transport them through the row of successive treatment units, and finally dispense them at a dispensing point.

The containers are in the process generally transferred to the plurality of transport elements by suitably designed feed conveyors at the pick-up points and correspondingly taken up by the plurality of transport elements by suitably designed discharge conveyors at the dispensing point. Both the feed conveyors and discharge conveyors and the individual container treatment units convey or treat, respectively, the container at a rate of containers per unit of time predetermined each by the operator personnel or a control means in response to the container to be treated, the process step and/or the performing treatment unit.

For a continuous and effective production, containers should reach the respective treatment unit or conveyor means at predetermined constant time intervals or at a constant predetermined speed of the transport elements with predetermined constant spatial intervals, the so-called division of a (product) stream.

Although the processing rate of the individual treatment units and/or the conveying rates of the conveyor means can be typically controlled by open-loop or closed-loop control, respectively, within certain limits, deviations from the predetermined rate, i.e. from the predetermined time interval or the predetermined spatial interval of two successive transport elements, in general lead to production delays since the processing rates of the individual treatment units can only be adapted with some delay.

In particular, gaps in the otherwise regular product stream of containers pose great difficulties for the open-loop or closed-loop control of treatment units since these temporarily have to operate with some delay, if a gap occurs, in order to be subsequently brought again to normal speed. In the process, in general, valuable production time is lost. The occurrence of gaps in the production stream of container treatment plants, however, is a common phenomenon, the gaps occurring e.g. by detecting the treatment condition of containers as faulty and by removing the containers from the system.

On the other hand, predetermined groupings and thus desired spaces between individual container groups can be intended; such groupings, however, cannot be easily realised technically in prior art.

The object underlying the present invention is to achieve an improved grouping of containers on their transport path in a container treatment plant.

The above-mentioned object is achieved by a device for grouping containers (for example bottles), comprising:
  a first conveyor belt for transporting the containers in a first transport direction;
  a second conveyor belt;
  a container receiving device;
  a transfer device which is configured to transfer at least some of the containers from the first conveyor belt to the second conveyor belt transversely to the first transport direction and to transfer at least some of the containers transferred to the second conveyor belt to the container receiving device transversely to the first transport direction; and
  a motor device, in particular a long stator motor device, which is in particular arranged above the first conveyor belt, the second conveyor belt and the container receiving device, and which is configured to move the transfer device for transferring the respective containers.

The movement of the transfer device can in principle be accomplished such that it is connected to the motor device and thereby follows a movement of the motor device which is, for example, effected by a corresponding portal system, and/or that it is effected via a motor force of the motor device remaining spatially stationary or moving itself. The motor device can be a linear motor which can move the transfer device along a rail system. The transfer transverse to the first transport direction can, but does not have to, be essentially perpendicular to the first transport direction. It will be appreciated that the transfer can, if the engagement elements are suitably designed, comprise a lifting and lowering of the containers.

Containers in the sense of the invention are in particular beverage bottles, but also other containers for food, medicine, sanitary products, cleaning agents or the like, such as e.g. cans, glass bottles or other glass containers with a lid, packages on the basis of carton or composites, Tetra Pak or the like. Equally, containers of plastics also comprise intermediates, in particular preforms for stretch blow moulding the containers.

The transfer device can comprise at least one movable shuttle element with a number of engagement elements of which each at least partially extends transversely to the first transport direction, so that the transfer device is configured, by means of the engagement elements, to group the respective containers on the second conveyor belt and/or the container receiving device. The shuttle element is a means movable along a rail system of the device in the first transport direction and can be moved along the rail system by the motor device. The generation of a closed container row on the second conveyor belt is here and below comprised of the term grouping. The second conveyor belt can be embodied separately from the first conveyor belt or be a part of the same.

According to one embodiment, each of the number of engagement elements is L-shaped and partially extends transversely, for example perpendicularly, to the first transport direction. By the L-shape, a reliable guidance of the engagement element into container spacings on the first conveyor belt is possible. Furthermore, the transfer device can comprise counter support elements of which each at least partially extends in parallel to the first transport direction. The counter support elements provide a securer manipulation of the containers by means of the transfer device, in particular protected against a falling over of the containers. The transfer device can comprise movable spacer means which are configured to adjust a distance between the counter support elements and parts of the engagement elements. Thereby, an adaptation to various sizes of containers is possible. A selected distance can be maintained by pushing an arrest mounted in a spacer of the spacer means onto a toothed rack by means of a spring.

Here, moreover a transfer device for transferring a container transported on a conveyor belt to a device for transporting the container further is provided, wherein the transfer device comprises an L-shaped engagement element, a counter support element arranged opposite a leg of the L of the L-shaped engagement element, and movable spacer means which are configured to adjust distances between the counter support elements and the leg. The movable spacer means here comprise a toothed rack and a spacer with an arrest and a spring mounted therein. Thereby, an adaptation to various sizes of containers is possible. A selected distance can be maintained by pushing an arrest mounted in a spacer of the spacer means, by means of a spring which is also mounted in the spacer of the spacer means, onto a toothed rack of the spacer means.

In the above-mentioned embodiments, the motor device can be designed to move the transfer device such that the engagement elements are guided between the containers on the first conveyor belt, that containers are transferred from the first conveyor belt, by means of the engagement elements, to the second conveyor belt, and containers are transferred from the second conveyor belt to the container receiving device. Here, the motor device can suitably move the engagement elements over the mentioned shuttle elements, and/or the motor device can be suitably moved with the shuttle elements by a corresponding system. In particular, the motor device can be designed to move the shuttle elements and thus the engagement elements such that the containers transferred to the second conveyor belt are slowed down on the second conveyor belt or shifted opposite to the first transport direction.

In this way, the device according to the invention can furthermore be equipped with a portal system which is configured to move the motor device in a second transport direction transverse to the first transport direction and perpendicular to a plane comprising the first and the second transport directions, such that the engagement elements are guided from above the first conveyor belt between the containers on the first conveyor belt, that containers are transferred from the first conveyor belt, by means of the engagement elements, to the second conveyor belt, and containers transferred to the second conveyor belt are transferred from the second conveyor belt to the container receiving device. That means the portal system carries the motor device and can move it, as well as the rail system along which the shuttle elements can be moved by the motor device in the first transport direction, to and fro perpendicularly to the first transport direction and vertically. For manipulating the containers on the first conveyor belt, the portal system can guide the motor device with the shuttle elements and the rail system from the top to the bottom, and after the transfer of containers to the container receiving device, it can guide the motor device with the shuttle elements and the rail system from the bottom to the top.

In all embodiments of the device according to the invention, the container receiving device can comprise means for moving/further transporting/grouping the transferred containers, for example in the form of support elements on a rotating belt, which are configured to move and group the containers transferred from the second conveyor belt on the container receiving device.

The transferred containers can be supplied from the container receiving device, for example, to one or more packaging stations for packing grouped containers, where packaging stations of different formats (for example, a packaging as a six-pack or 20-pack) or packaging stations for packing containers of different materials can be employed. It can also be provided for the containers to be picked up, after the grouping and movement on the container receiving device, by a driverless transport system (DTS) or an automated guided vehicle (AGV). According to a further example, the containers are palletised after the grouping and movement on the container receiving device, and the pallets can be picked up by the DTS/AGV. It will also be appreciated that in the device according to the invention, a plurality of first and/or second conveyor belts can be provided from which containers can be selectively transferred to the container receiving device.

Furthermore, the device can comprise, in all above-described embodiments, a further motor device, in particular a further long stator motor device, wherein the further motor device is configured to move at least one further movable shuttle element which is coupled to the above-mentioned at least one shuttle element of the above-mentioned motor device, in particular with an engagement element of a shuttle element of the motor device. The coupling can be effected by a coupling rod. The motor device and the further motor device are here arranged, together with their respective associated rail systems, in parallel to the first transport direction, and in this first transport direction, offset with respect to each other. By a relative movement of elements coupled to each other in the first transport direction, engagement elements can be guided transversely to the first transport direction.

Furthermore, a device for grouping containers is provided, comprising:

a first conveyor belt for transporting the containers in a first transport direction;

a container receiving device;

a transfer device which is configured to transfer at least some of the containers from the first conveyor belt to the second conveyor belt transversely to the first transport direction, and to transfer at least some of the containers transferred to the second conveyor belt to the container receiving device transversely to the first transport direction;

a first rail system oriented in parallel to the first transport direction;

a second rail system oriented in parallel to the first transport direction;

a first motor device, in particular a long stator motor device, which is arranged above the first conveyor belt, the second conveyor belt and the container receiving device, and which is configured to move the transfer device for transferring the respective containers, wherein the transfer device comprises a first shuttle element with a number of engagement elements movable along the first rail system, each of the engagement elements at least partially extending transversely to the first transport direction, so that the transfer device is configured to group, by means of the engagement elements, the respective containers on the second conveyor belt and/or the container receiving device and to transfer the respective containers; and a second motor device, in particular a second long stator motor device, which is arranged above the first conveyor belt, the second conveyor belt and the container receiving device, and which is arranged offset with respect to the first motor device in the first transport direction and is configured to move a second shuttle element along the second rail system, and wherein the second shuttle element is coupled to the first couple element, in particular with an engagement element of the first shuttle element and via a coupling rod.

This device can also comprise a second conveyor belt which is arranged between the first conveyor belt and the container receiving device, wherein the transfer device is configured to transfer at least some of the containers transported on the first conveyor belt from the first conveyor belt to the second conveyor belt. Here, too, the first motor device or the transfer device, respectively, can be designed to slow down the containers transferred to the second conveyor belt and/or to shift them against the first transport direction and/or to group them. The transfer device can be defined as described above. In particular, the container receiving device can be designed as described above, and it can in particular be designed to group the transferred containers.

The above-described examples of a device for grouping containers can be employed in a plant for treating containers. Thus, a filling line having a device for grouping containers according to one of the above-described examples, and, for example, having a filling machine and/or a labelling machine and/or a packaging machine and/or a direct printing machine and/or a blow moulding machine is also provided here.

By means of the above-described embodiments of the device according to the invention, methods for grouping containers and discharging defective containers that do not undergo any manipulation by the transfer device and thus remain on the first conveyor belt can be performed.

BRIEF DESCRIPTION OF THE FIGURES

Further features and exemplary embodiments as well as advantages of the present invention will be illustrated more in detail hereinafter with reference to the drawings. It will be understood that the embodiments do not exhaust the field of the present invention. It will be furthermore understood that some or all features described below may also be combined with each other in a different way.

DETAILED DESCRIPTION

Figure 1A:
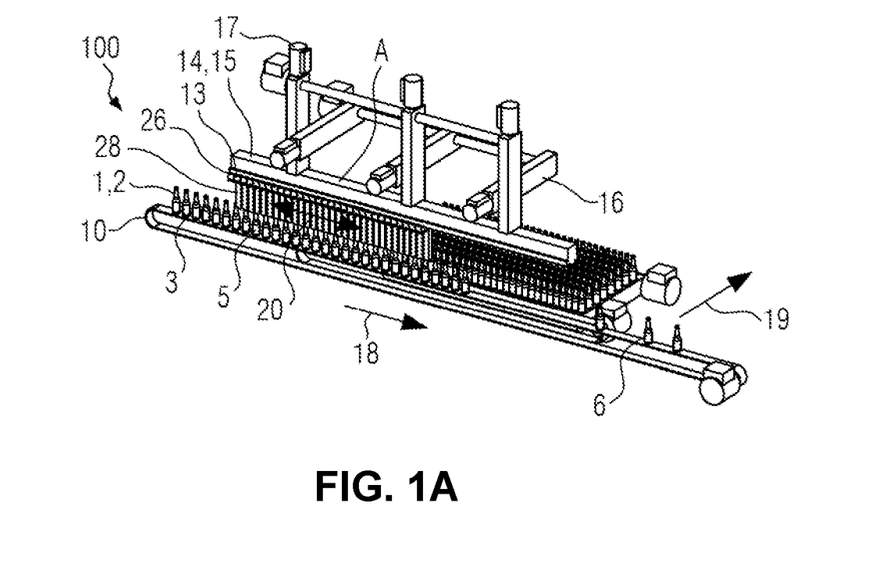
FIGS. 1A, 1B and 1C represent a device for grouping containers according to an example of the present invention.
Figure 1B:
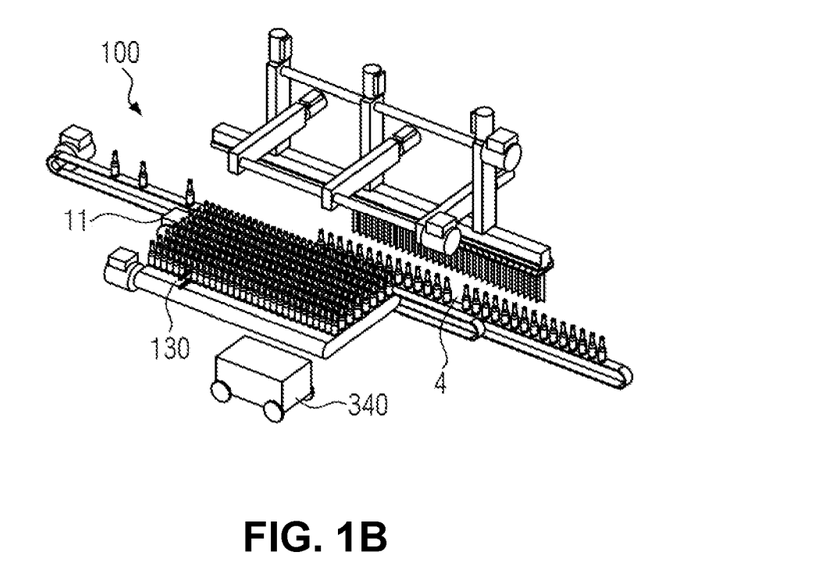
Figure 1C:
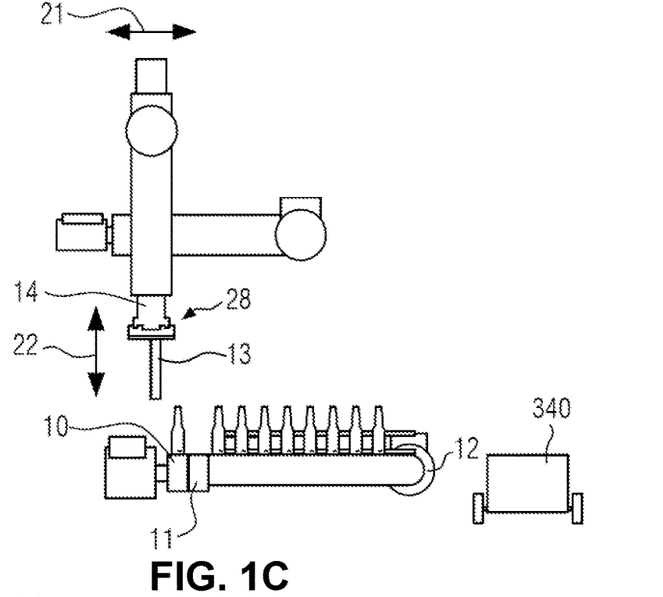
Figure 2:
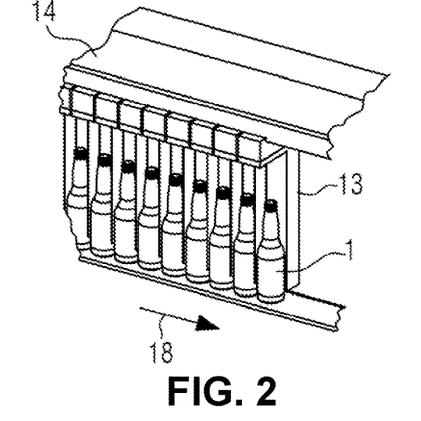
FIG. 2 shows an engagement of engagement elements of a transfer device of the device shown in FIGS. 1A, 1B, 1C in a container stream.
Figure 3:
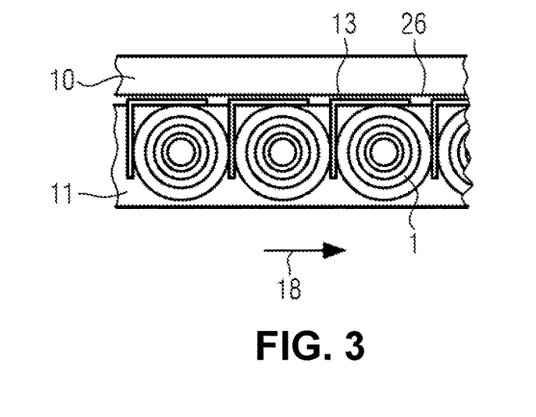
FIG. 3 illustrates a transfer of containers from an inlet belt to an intermediate belt of the device shown in FIGS. 1A, 1B, 1C.

An exemplary device 100 for grouping containers according to the present invention is shown in FIGS. 1A, 1B and 1C. Further details are shown in FIGS. 2 and 3. The device comprises a first conveyor belt in the form of an inlet belt 10 on which containers 1 of a container stream 2 are supplied. Individual containers 1 are separated from one another on the inlet belt by division gaps (a container division) 3. As is shown in FIG. 1B, relatively large undesired gaps 4, for example due to a loss of containers, can occur in the container stream 2 on the inlet belt 10. On the other hand, a defective container to be discharged is designated with reference 5 in FIG. 1A. Reference numeral 6 in FIG. 1A shows a defective container remaining on the inlet belt 10 after the transfer/grouping to be described below, which is thus discharged.

Containers in the sense of the invention are in particular beverage bottles, but also other containers for food, medicine, sanitary products, cleaning agents or the like, such as e.g. cans, glass bottles or other glass containers with a lid, packages on the basis of carton or composites, Tetra Pak or the like. The containers 1 can simply stand on the inlet belt 10 or be located on respective transport elements/carriers.

Furthermore, the device 100 comprises a second conveyor belt (intermediate belt) 11, a container receiving device (a transverse system) 12, and a long stator motor system A arranged above the inlet belt 10, the intermediate belt 11, and the container receiving device 12, including movable shuttle elements 26 acting as transfer device 28 and having engagement elements (paddle) 13, a long stator linear motor 14, and a rail system 15. The moving direction 20 of the shuttle elements 26 corresponds to the conveying direction 18. The intermediate belt 11 can run at the same speed as the inlet belt 10 and in parallel thereto, and it can be part of the inlet belt 10, for example a broadening of the latter, or be designed separate from the inlet belt 10.

The container receiving device 12 comprises means for moving transferred containers, and these means can comprise a conveyor belt. For example, the transferred containers can be transported and grouped on carrier elements fixed to a conveyor belt of the container receiving means 12 transversely to the transport direction 18 (see reference numeral 19 in FIG. 1A). Containers, such as the container 6 in FIG. 1A, which are not manipulated by the engagement elements 13, remain on the inlet belt 10.

The long stator motor system A can be moved, by means of a portal system (Y-Z-linear axis portal system) 16, 17, vertically (in the z-direction; see reference numeral 22 in FIG. 1C), and transversely to the running direction (transport direction) 18 of the inlet belt 10, i.e. in the y-direction 21 of FIG. 1C. The shuttle elements 26 with the engagement elements 13 are arranged one behind the other on the rail system 15 and can be moved by means of the long stator linear motor 14 in or against the transport direction 18. The engagement elements 13 are used for transferring selected containers 1 from the inlet belt 10 to the intermediate belt 11 or the container receiving device 12, respectively.

The engagement of the engagement elements 13 in the container stream 2 of the containers 1 is illustrated in FIG. 2. The engagement can be effected from above (from the z-direction) and/or perpendicularly to the transport direction 18 (from the y-direction), and it can be effected such that initially no contact of a container 1 occurs on the inlet belt 10. To this end, the portal system 16, 17, can correspondingly move the long stator linear motor A with the shuttle elements 26. The control of the engagement can be accomplished via a non-depicted control means of the device 100.

FIG. 3 illustrates a transfer of containers 1 from the inlet belt 10 onto the intermediate belt 11 also running in the transport direction 18, and which can run, for example, at the same speed as the inlet belt. In the shown examples, the engagement elements 13 have an L-shaped geometry, wherein one part of the L is arranged in parallel to the transport direction 18, and the other part of the L is arranged perpendicularly thereto.

In operation, the engagement elements 13 can be synchronised with the containers 1 that are to be manipulated, so that one shuttle element 26 with an engagement element 13 is associated with each container 1 to be manipulated. After synchronisation, the containers 1 move on the inlet belt 10, and the shuttle elements 26 of the long stator motor system A move in parallel with respect to each other at the same speed and in the same direction, and the part of the L of the engagement element 13 oriented perpendicularly to the transport direction 18 is located at a relatively small distance, in the transport direction 18, in front of the container 1 to be manipulated, as can be seen in FIGS. 2 and 3.

For the transfer, the containers 1 are taken up by the engagement elements 13, as is shown in FIG. 3. More precisely, the containers 1 are transferred from the inlet belt 10 to the intermediate belt 11, with the parts of the L oriented in parallel to the transport direction 18, transversely to the transport direction, where they are supported by the parts of the L oriented perpendicularly to the transport direction 18. In the position shown in FIG. 3, the containers 1 are withdrawn from the container stream 2 of the inlet belt 10 and can be further manipulated independent thereof. For example, containers subsequently running in via the inlet belt 10 can overtake the containers transferred to the intermediate belt 11 in the transport direction 18.

The containers transferred to the intermediate belt 11 can in turn be slowed down by a movement of the shuttle elements 26 effected by the long stator linear motor 14 by means of the engagement elements 13, namely by means of the part of the L oriented perpendicularly to the transport direction 18, or be shifted against the transport direction 18, whereby closed container rows or container groups (grouped in the transport direction 18) can be created on the intermediate belt 11. In case of relatively large gaps 4 in the container stream 2 on the inlet belt 10, a closed container row can be created on the intermediate belt 11 by means of two or more successive transfer operations (travels).

Figure 4A:
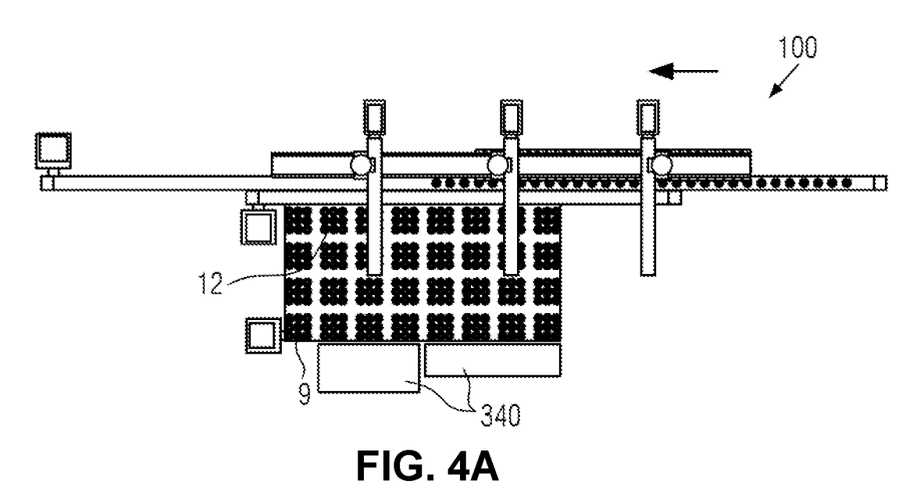
FIGS. 4A and 4B illustrate groupings on a container receiving device of the device shown in FIGS. 1A, 1B, 1C.
Figure 4B:
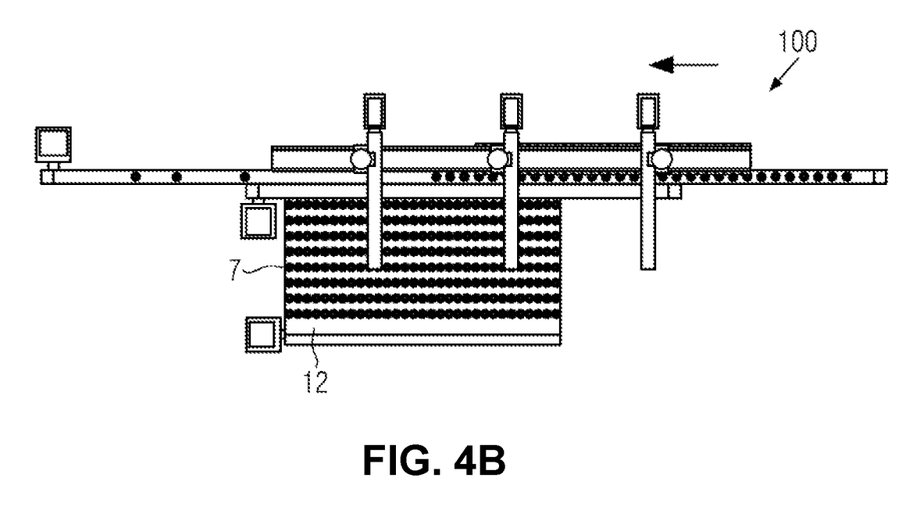

By means of the shuttle elements 26 with the engagement elements 13, the containers transferred to the intermediate belt 11 can be further transferred to the container receiving device 12 transversely to the transport direction 18. For example, for this purpose, the long stator motor system A can be moved perpendicularly to the transport direction 18 (x-direction) in the y-direction by the portal system 16, 17. In particular, containers grouped in the transport direction 18 can be transferred from the intermediate belt 11 onto the container receiving device 12, as is shown in FIG. 4A, or a container row 7 closed in the transport direction 18 can be transferred from the intermediate belt 11 onto the container receiving device 12, as is shown in FIG. 4B. On the container receiving device 12, the containers can be moved further, in particular grouped, perpendicularly to the transport direction. Thus, container groups 9 grouped in the x- and y-directions, or container rows 7 grouped in the y-direction and closed in the x-direction, respectively, can be created on the container receiving device 12 (see FIGS. 4A and 4B). The grouping of the containers on the container receiving device 12 can be achieved by a corresponding clock rate of carrier elements moving in the y-direction (for example, on a circulating belt).

The further moved/grouped containers can then be supplied from the container receiving device 12 of a treatment station, for example one or optionally several packaging machines with different packaging formats. It can also be provided for the containers to be picked up, after the grouping on the container receiving device 12, by one or more driverless transport systems (DTS) or automated guided vehicles (AGV) 340 of optionally various sizes, or they can be palletised on the container receiving device 12, so that the pallets can be collected by a DTS/AGV 340. The FTS/AGV 340 can take up and store, for example, the pallets at several levels, and it can supply, simultaneously or at different times, the container receiving device 12 with empty pallets.

After the containers have been transferred from the intermediate belt 11 to the container receiving device 12, the long stator motor system A with the long stator linear motor 14, the rail system 15, the shuttle elements 26 with the engagement elements 13, is lifted vertically by the Y-Z-linear axis portal system 16, 17 (in the z-direction) to a height where the lower edges of the engagement elements 13 are above the height of the upper edges of containers newly running in on the inlet belt 10, and the shuttle elements are moved back to their original position against the transport direction 18 and the y-direction, so that a new grouping operation can be performed.

A further example of a device 200 according to the invention for grouping containers is shown in FIGS. 5A, 5B, 5C and 5D. Elements which are identical to those shown in FIGS. 1A to 1C have the same reference numerals. The description of FIGS. 1A to 1C correspondingly applies. In contrast to the configuration shown in FIGS. 1A, 1B and 1C, the device 200 shown in FIGS. 5A to 5D comprises two long stator motor systems A, B, each with a long stator linear motor 14, 25, and a rail system 15. The long stator motor systems A, B are arranged, in the transport direction 18, in parallel and offset with respect to each other. The shuttle elements 16, 26 of both long stator motor systems A, B can be moved in a moving direction 20 parallel to the transport direction 18 by the long stator linear motor 14, 25.

Figure 5A:
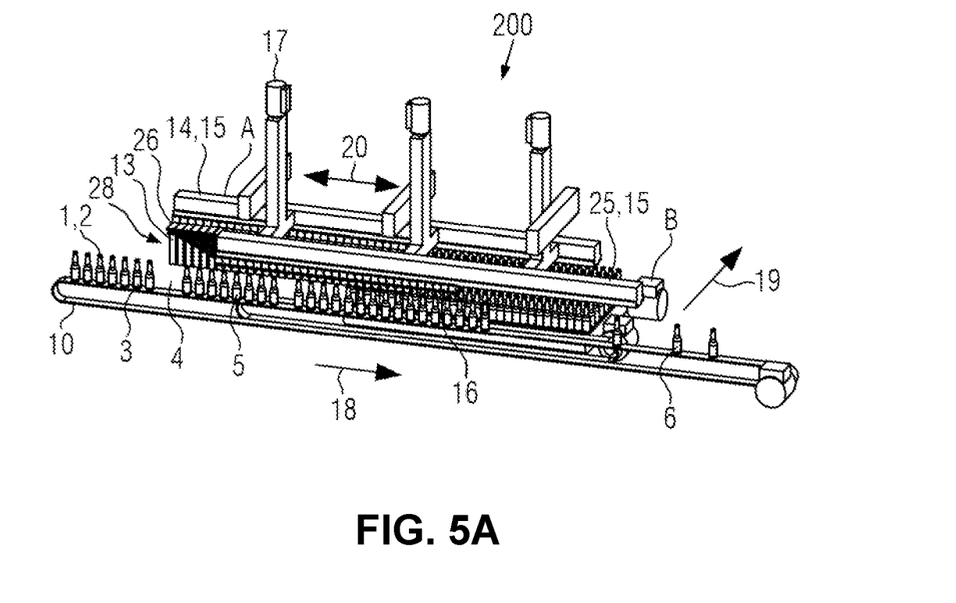
FIGS. 5A, 5B, 5C and 5D represent a further example of a device for grouping containers of the present invention.
Figure 5B:
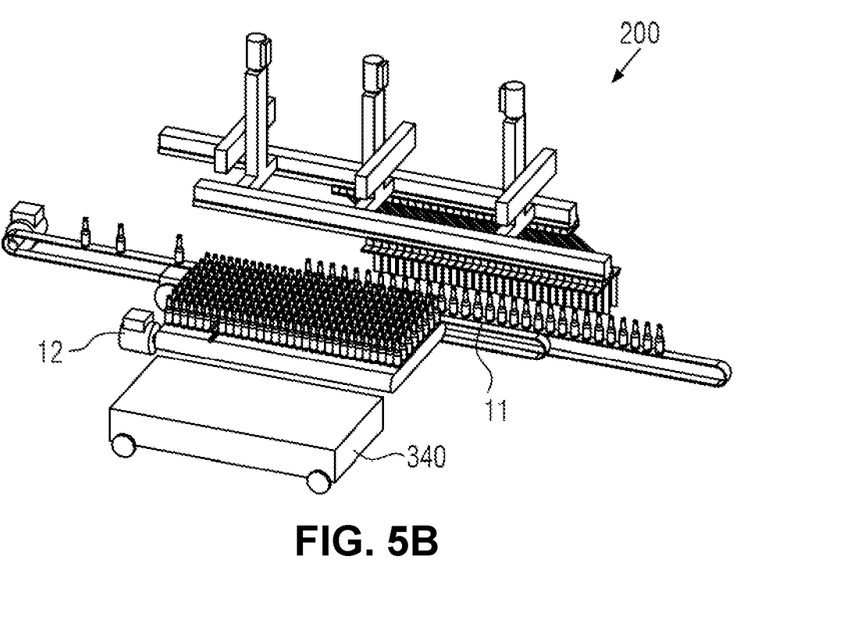
Figure 5C:
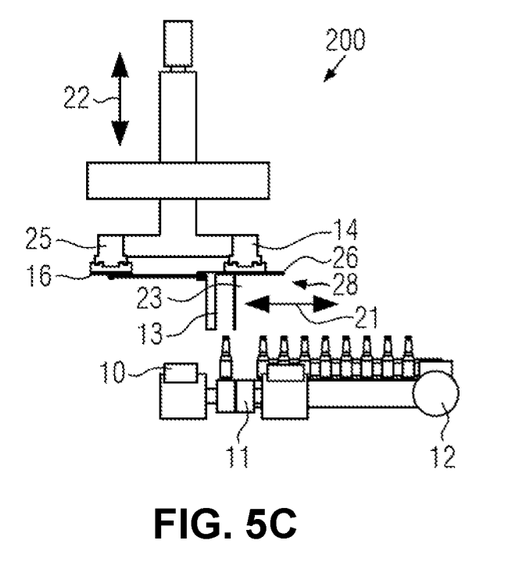
Figure 5D:
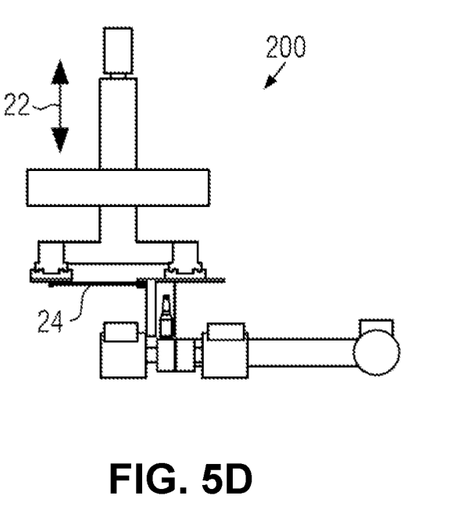

The shuttle elements 26 of the long stator motor system A comprise engagement elements (paddles) 13 which are similar to those described above. The shuttle elements 26 of the long stator motor system A with the engagement elements (paddles) 13 represent a transfer device 28. The shuttle elements 16 of the long stator motor system B do not comprise such engagement elements. The shuttle elements 16 of the long stator motor system B are connected to the engagement elements 13 of the shuttle elements 26 of the long stator motor system A via rods 24, as is shown in FIG. 5C. The connection by the coupling rods 24 is such that the engagement elements 13 are shifted by an increase of the distance between the shuttle elements of the long stator motor systems A, B in the transport direction 18 transversely to the transport direction 18.

Figure 6:
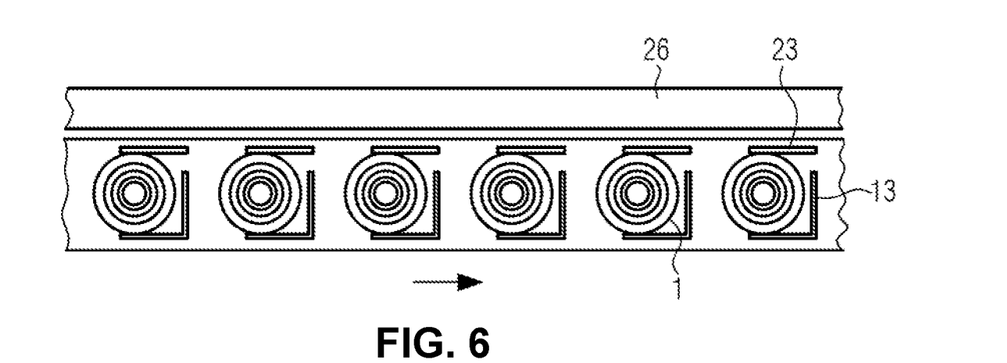
FIG. 6 shows an engagement of engagement elements of a transfer device of the device shown in FIGS. 5A, 5B, 5C in a container stream.

As in the example shown in FIG. 3, the engagement elements 13 can be L-shaped (see FIG. 6). The engagement elements 13 are fixed to corresponding shuttle elements 26 which can move in the rail system 15 of the long stator motor system A and furthermore comprise counter support elements 23 oriented in parallel to the transport direction 18 (see FIG. 6). Of course, such counter support elements 23 can also be provided in the configuration shown in FIG. 3. The containers 1 of the container stream 2 running in on the inlet belt 10 then run, after synchronisation, between the engagement elements 13 and the counter support elements 23 (see FIG. 5C). After synchronisation, the containers 1 move on the inlet belt 10, and the shuttle elements 26 of the long stator motor system A as well as the shuttle elements 16 of the long stator motor system B move in parallel with respect to each other at the same speed and in the same direction, and the part of the L of the engagement element 13 oriented perpendicularly to the transport direction 18 is located at a relatively small distance, in the transport direction 18, in front of the container 1 to be manipulated, as can be seen in FIG. 6.

Figure 7:
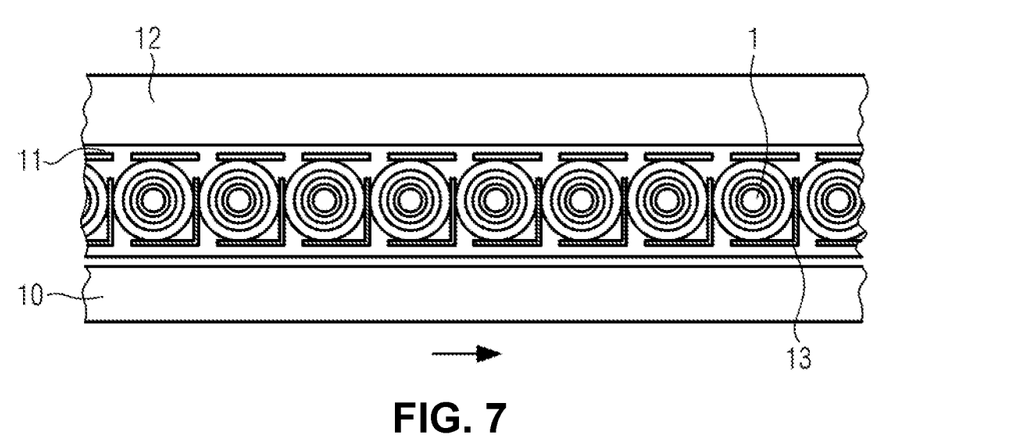
FIG. 7 illustrates a transfer of containers from an inlet belt to an intermediate belt of the device shown in FIGS. 5A, 5B, 5C.

By means of the engagement elements 13 and the counter support elements 23, containers 1 can be transferred from the inlet belt 10 to the intermediate belt 11, and from there to the container receiving device 12 (see FIG. 7). During the transfer operation, the counter support element 23, the part of the L-shaped engagement element 13 which is oriented in parallel to the transport direction 18, and the part of the L-shaped engagement element 13 which is oriented perpendicularly to the transport direction 18 move in synchronism, so that the manipulated container always remains supported from three sides for a safe transfer.

The movement of the engagement elements 13 perpendicular to the transport direction 18 is caused by an increase of the distance between shuttle elements 26 of the long stator motor system A and shuttle elements 16 of the long stator motor system B, which are coupled to each other, by a correspondingly controlled movement of the shuttle elements 16 by the long stator linear motor 14, and/or the shuttle elements 26 by the long stator linear motor 25.

The containers transferred to the intermediate belt 11 can in turn be slowed down by means of the engagement elements 13, namely by means of the part of the L oriented perpendicularly to the transport direction 18, or be shifted against the transport direction 18, whereby closed container rows or container groups (grouped in the transport direction 18) can be created on the intermediate belt 11.

In the device 200, too, the containers transferred to the intermediate belt 11 can, as described above with reference to the device 100 shown in FIGS. 1A to 1C, be further transferred to the container receiving device 12 transversely to the transport direction 18. In particular, containers grouped in the transport direction 18 can be transferred from the intermediate belt 11 to the container receiving device 12, or a container row closed in the transport direction 18 can be transferred from the intermediate belt 11 to the container receiving device 12. On the container receiving device 12, the containers can be moved further, in particular grouped, perpendicularly to the transport direction. Thus, container groups 9 grouped in the x- and y-directions, or container rows 7 grouped in the y-direction and closed in the x-direction, can be created, as was already described above with reference to FIGS. 4A and 4B.

Both the device 100 shown in FIGS. 1A to 1C and the device 200 shown in FIGS. 5A to 5D permit a reliable desired container grouping of a container stream subsequently supplied on the inlet belt 10 without interruption. The devices 100 and 200 can each comprise more than one inlet belt 10 and/or intermediate belt 11, so that various container types can be selectively supplied to the container receiving device 12. By the grouping on the intermediate belt 11, gaps 4 of any size in the container stream 2 on the inlet belt 10 can be buffered.

That means, one container stream 2 each with relatively small division gaps 3 and relatively large gaps 4, which are created, for example, by lost containers, and with defective containers 6 can be treated such that defective containers 6 are discharged on the inlet belt without manipulation, and grouped container formations are provided by the container receiving device 12 for further processing. For further processing, the devices 100 and 200 can comprise one or more workstations, for example packaging stations, downstream of the container receiving device 12.

Figure 8:
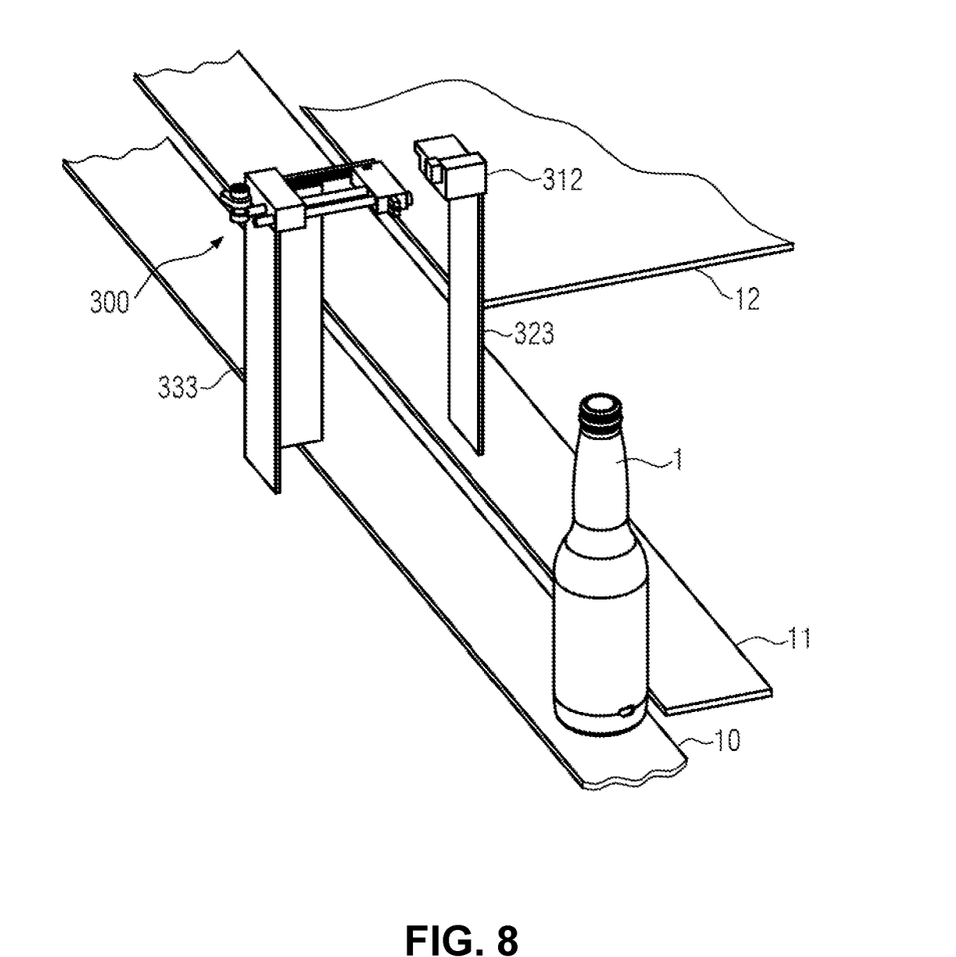
FIG. 8 illustrates a part of a transfer device that can be employed in the device shown in FIGS. 1A to 1C and FIGS. 5A to 5C.
Figure 9A:
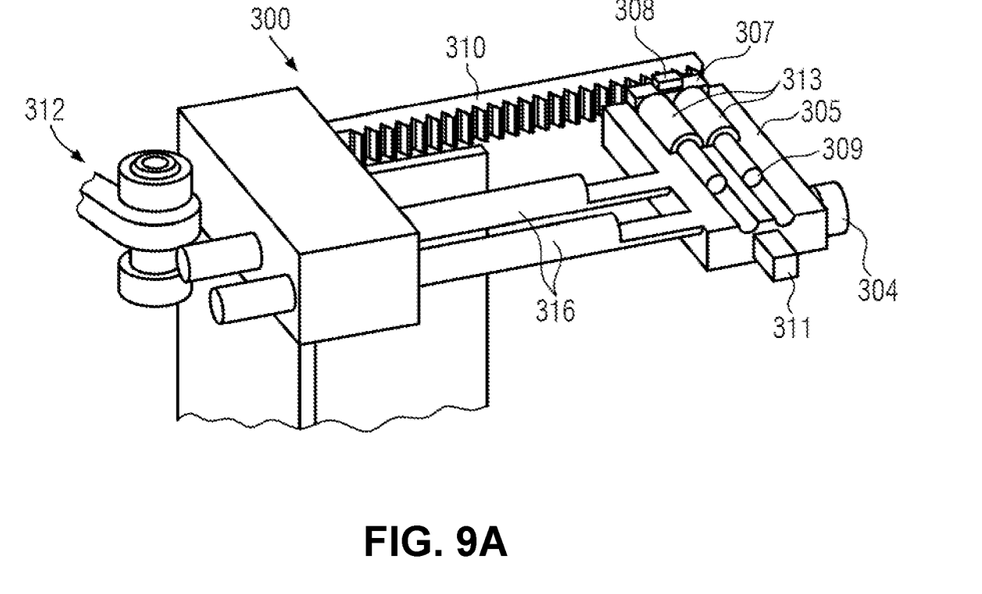
FIGS. 9A and 9B show details of the part of a transfer device illustrated in FIG. 8.
Figure 9B:
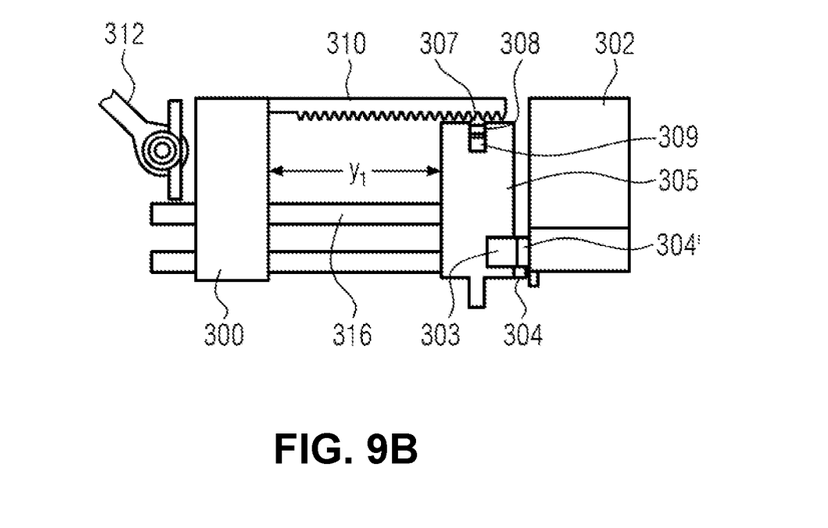

As described above, the manipulation of the containers is effected by means of a transfer device with engagement elements. Below, a particular example of a design of a part of a transfer device is described. FIG. 8 shows a container 1, in this case a plastic bottle, by way of example, on an inlet belt 10. Moreover, an intermediate belt 11 and a container receiving device 12 are indicated (cf. description above). A pushing device 300 comprises an L-shaped engagement element 333 for transferring the container 1 onto the intermediate belt 11. A counter support plate 312 is attached to a counter support 302. In FIG. 8, the pushing device 300 is shown in an open state in which the container can pass on the inlet belt 10. Details of the pushing device 300 are illustrated in FIGS. 9A and 9B.

The pushing device 300 can be moved via a shifting mechanism 312 which is connected to one of the above-mentioned movable satellite elements 26. In this way, according to this example, the pushing device 300 can form a transfer device in the sense of the present invention with its satellite element 26 associated therewith. By a movement caused by the satellite element transverse to the running direction of the inlet belt 10, a container can be transferred from the inlet belt 10 onto the intermediate belt 11 by means of the engagement elements 333 and the counter support plate 312. A shiftable spacer 305 is movably mounted on guides 316.

The shiftable spacer 305 permits the adaptation to varying container dimensions of containers 1 to be manipulated. A selected distance y1 can be adjusted by pushing an arrest 317, which is mounted in the spacer 305, by means of a spring 313 onto a toothed rack 310. The spacer 305 can be fixed to a counter support 312, to which the counter support plate 323 is fixed, by means of a magnet 304. The counter support 312 in turn comprises a magnet 304' below a stop 303. The resulting closed state of the pushing device 300 in which a container 1 can be manipulated is shown in a plan view in FIG. 9B. In this state, a container 1 can be securely transferred from the inlet belt 10 to the intermediate belt 11 and the container receiving device 12, where it can be supported against falling over by the L-shaped engagement element 333 and the counter plate 323.

If two pushing devices 300 travel together along a rail system, for example along a rail system of a long stator motor system (see above), in the x-direction, i.e. in parallel to the running direction of the inlet belt 10, the adjustment pin 311 of one of the two pushing devices 300 will push onto a corresponding adjustment flange 308 of the other one of the two pushing devices 300, whereby the arrest 307 mounted in the x-direction will be pushed into the spring 313, so that the connection between the arrest 307 and the toothed rack 310 will be released. When the two pushing devices 300 move apart again, the spring 313 pushes the arrest 307 back again into the toothed rack 310, so that again a securely closed state of the pushing device 300 can be obtained.

The invention claimed is:

1. A device for grouping containers, the device comprising:
   a first conveyor belt for transporting the containers in a first transport direction;
   a second conveyor belt;
   a container receiving device;
   a transfer device which is configured to transfer at least some of the containers from the first conveyor belt to the second conveyor belt transversely to the first transport direction and to transfer at least some of the containers transferred to the second conveyor belt to the container receiving device transversely to the first transport direction; and
   a motor device configured to move the transfer device for transferring respective containers.

2. The device according to claim 1, wherein the transfer device comprises at least one movable shuttle element having a number of engagement elements of which each extends at least partially transversely to the first transport direction, so that the transfer device is configured, by means of the engagement elements, to group the respective containers on the second conveyor belt and/or the container receiving device and to transfer respective containers.

3. The device according to claim 2, wherein each one of the number of engagement elements is L-shaped and partially extends transversely to the first transport direction.

4. The device according to claim 3, wherein the transfer device comprises counter support elements of which each at least partially extends in the first transport direction.

5. The device according to claim 4, wherein the transfer device comprises spacer means which are configured to adjust distances between the counter support elements and parts of the engagement elements.

6. The device according to claim 5, wherein the spacer means comprise a spacer with an arrest mounted therein and a spring and a toothed rack which are configured such that the arrest can be pushed onto the toothed rack by means of the spring.

7. The device according to claim 2, wherein the motor device is configured to move the transfer device such that the engagement elements are guided between the containers on the first conveyor belt, that containers are transferred from the first conveyor belt to the second conveyor belt by means of the engagement elements, and containers are transferred from the second conveyor belt to the container receiving device.

8. The device according to claim 7, wherein the motor device is configured to move the transfer device such that the engagement elements slow down the containers transferred to the second conveyor belt or shift them opposite to the first transport direction.

9. The device according to claim 2, furthermore comprising a portal system which is configured to move the motor device in a second transport direction transversely to the first transport direction and perpendicularly to a plane comprising the first and second transport directions, such that the engagement elements are guided from above the first conveyor belt between containers on the first conveyor belt, that containers are transferred from the first conveyor belt to the second conveyor belt by means of the engagement elements, and containers transferred from the second conveyor belt to the second conveyor belt are transferred to the container receiving device.

10. The device according to claim 2 which furthermore comprises a further motor device, wherein the further motor device comprises at least one further movable shuttle element which is coupled to the at least one movable shuttle element of the motor device.

11. The device according to claim 10, wherein the further motor device is a further long stator motor device.

12. The device according to claim 10, wherein the at least one further movable shuttle element is coupled to an engagement element of a shuttle element of the motor device.

13. The device according to one of the preceding claim 1, wherein the container receiving device comprises means for moving the transferred containers, which are configured to group the containers transferred from the second conveyor belt.

14. The device according to claim 13, wherein the means for moving the transferred containers includes carrier elements on a rotating belt.

15. The device according to claim 1, wherein the motor device is a long stator motor device.

16. A device for grouping containers, the device comprising:
   a first conveyor belt for transporting the containers in a first transport direction;
   a container receiving device;
   a transfer device which is configured to transfer at least some of the containers from the first conveyor belt to a second conveyor belt transversely to the first transport direction, and to transfer at least some of the containers transferred to the second conveyor belt to the container receiving device transversely to the first transport direction;
   a first rail system oriented in parallel to the first transport direction;
   a second rail system oriented in parallel to the first transport direction;
   a first motor device, which is arranged above the first conveyor belt, the second conveyor belt, and the container receiving device, and which is configured to move the transfer device for transferring respective containers, wherein the transfer device comprises a first shuttle element movable along the first rail system with a number of engagement elements of which each at least partially extends transversely to the first transport direction, so that the transfer device is configured, by means of the engagement elements, to group the respective containers on the second conveyor belt and/or the container receiving device and to transfer the respective containers; and a second motor device, which is arranged above the first conveyor belt, the second conveyor belt and the container receiving device and offset, in the first transport direction, with respect to the first motor device, and which is configured to move a second shuttle element along the second rail system, and wherein the second shuttle element is coupled to the first shuttle element.

17. The device according to claim 16, wherein the second conveyor belt which is arranged between the first conveyor belt and the container receiving device, and wherein the transfer device is configured to transfer at least some of the containers transported on the first conveyor belt from the first conveyor belt to the second conveyor belt.

18. The device according to claim 17, wherein the transfer device is configured to slow down the containers transferred to the second conveyor belt and/or shift them against the first transport direction and/or group them.

19. The device according to claim 16, wherein the second shuttle element is coupled to the first shuttle element via a coupling rod.

20. A transfer device for transferring a container transported on a conveyor belt to a device for further transporting the container, wherein the transfer device comprises:

an L-shaped engagement element;

a counter support element arranged opposite a leg of the L of the L-shaped engagement element; and movable spacer means which are configured to adjust a distance between the counter support element and the leg of the L-shaped engagement element, wherein the movable spacer means comprise a toothed rack and a spacer with an arrest and a spring mounted therein.

\* \* \* \* \*